(12) United States Patent
Kozuka et al.

(10) Patent No.: US 9,684,200 B2
(45) Date of Patent: Jun. 20, 2017

(54) LIQUID CRYSTAL DISPLAY DEVICE

(71) Applicant: Japan Display Inc., Minato-ku (JP)

(72) Inventors: Tomoko Kozuka, Tokyo (JP); Keiji Tago, Tokyo (JP); Hirokazu Morimoto, Tokyo (JP)

(73) Assignee: Japan Display Inc., Minato-ku (JP)

( * ) Notice: Subject to any disclaimer, the term of this patent is extended or adjusted under 35 U.S.C. 154(b) by 105 days.

(21) Appl. No.: 14/323,358

(22) Filed: Jul. 3, 2014

(65) Prior Publication Data
US 2015/0009462 A1  Jan. 8, 2015

(30) Foreign Application Priority Data

Jul. 4, 2013 (JP) ................................ 2013-140512

(51) Int. Cl.
*G02F 1/1335* (2006.01)

(52) U.S. Cl.
CPC .............................. *G02F 1/133514* (2013.01)

(58) Field of Classification Search
CPC .................... G02F 1/133371; G02F 1/133514
USPC ........................................................ 349/107
See application file for complete search history.

(56) References Cited

U.S. PATENT DOCUMENTS

| | | | | |
|---|---|---|---|---|
| 7,545,467 B2 * | 6/2009 | Hung | ................ | G02F 1/133555 349/106 |
| 8,130,344 B2 * | 3/2012 | Tsuchiya | ........... | G02F 1/133514 349/107 |
| 8,605,244 B2 | 12/2013 | Takeda et al. | | |
| 8,780,302 B2 | 7/2014 | Takeda et al. | | |

FOREIGN PATENT DOCUMENTS

| | | |
|---|---|---|
| JP | 2004-354662 | 12/2004 |
| JP | 2005-258094 | 9/2005 |
| JP | 2009-3002 | 1/2009 |
| JP | 2013-80584 | 5/2013 |
| WO | 2013/051428 A1 | 4/2013 |

* cited by examiner

*Primary Examiner* — Nathanael R Briggs
*Assistant Examiner* — William Peterson
(74) *Attorney, Agent, or Firm* — Oblon, McClelland, Maier & Neustadt, L.L.P.

(57) ABSTRACT

A liquid crystal display device includes a first substrate, a second substrate including an insulative substrate and a color filter layer formed on that side of the insulative substrate, which is opposed to the first substrate, the color filter layer including a first color filter of red, a third color filter of blue which is spaced apart from the first color filter, a fifth color filter of red which is spaced apart from the third color filter, a second color filter which is located between the first color filter and the third color filter and has a color which is different from red and blue, and a fourth color filter which is located between the third color filter and the fifth color filter and has a color which is different from red and blue, and a liquid crystal layer.

18 Claims, 6 Drawing Sheets

LIQUID CRYSTAL DISPLAY DEVICE

CROSS-REFERENCE TO RELATED APPLICATIONS

This application is based upon and claims the benefit of priority from Japanese Patent Application No. 2013-140512, filed Jul. 4, 2013, the entire contents of which are incorporated herein by reference.

FIELD

Embodiments described herein relate generally to a liquid crystal display device.

BACKGROUND

Liquid crystal display devices are used as display devices in various fields. A liquid crystal display device of a color display type includes, for example, stripe-shaped blue, green and red color filters. In recent years, as regards liquid crystal display devices, there has been an increasing demand for higher fineness and a wider viewing angle. In achieving higher fineness, it is necessary to arrange pixels at high density, and there is a tendency that intervals between neighboring pixels decrease. Thus, when a wider viewing angle is to be achieved, a measure against color mixing in an oblique view field is very important.

On the other hand, as a measure against color mixing or the like, there is known a technique wherein, in a color cell unit in which a first color cell, a second color cell, a third color cell and a fourth color cell are arranged in the named order, the second color cell and the fourth color cell are of the same type and have equal dimensions, while each of the first color cell and third color cell has an effective width which is about double the effective width of the second color cell.

DETAILED DESCRIPTION

In general, according to one embodiment, a liquid crystal display device includes: a first substrate including a switching element, a pixel electrode electrically connected to the switching element, and a common electrode of a common potential; a second substrate including an insulative substrate and a color filter layer formed on that side of the insulative substrate, which is opposed to the first substrate, the color filter layer including a first color filter of red, a third color filter of blue which is spaced apart from the first color filter, a fifth color filter of red which is spaced apart from the third color filter, a second color filter which is located between the first color filter and the third color filter and has a color which is different from red and blue, and a fourth color filter which is located between the third color filter and the fifth color filter and has a color which is different from red and blue; and a liquid crystal layer held between the first substrate and the second substrate.

According to another embodiment, a liquid crystal display device includes: a first substrate including a switching element, a pixel electrode electrically connected to the switching element, and a common electrode of a common potential; a second substrate including an insulative substrate and a color filter layer formed on that side of the insulative substrate, which is opposed to the first substrate, the color filter layer including a first color filter of red with a first width, a third color filter of blue which is spaced apart from the first color filter and has the first width, a fifth color filter of red which is spaced apart from the third color filter and has the first width, a second color filter of green which is located between the first color filter and the third color filter and has the first width, and a fourth color filter which is located between the third color filter and the fifth color filter, has a second width smaller than the first width and has a color which is different from red, blue and green; and a liquid crystal layer held between the first substrate and the second substrate.

According to another embodiment, a liquid crystal display device includes: a first substrate including a switching element, a pixel electrode electrically connected to the switching element, and a common electrode of a common potential; a second substrate including an insulative substrate and a color filter layer formed on that side of the insulative substrate, which is opposed to the first substrate, the color filter layer including a first color filter of red, a third color filter of blue which is spaced apart from the first color filter, a fifth color filter of red which is spaced apart from the third color filter, a second color filter of green which is located between the first color filter and the third color filter, and a fourth color filter of green which is located between the third color filter and the fifth color filter; and a liquid crystal layer held between the first substrate and the second substrate.

An embodiment will be described hereinafter with reference to the accompanying drawings. In the drawings, structural elements having the same or similar functions are denoted by like reference numerals, and an overlapping description is omitted.

Figure 1:
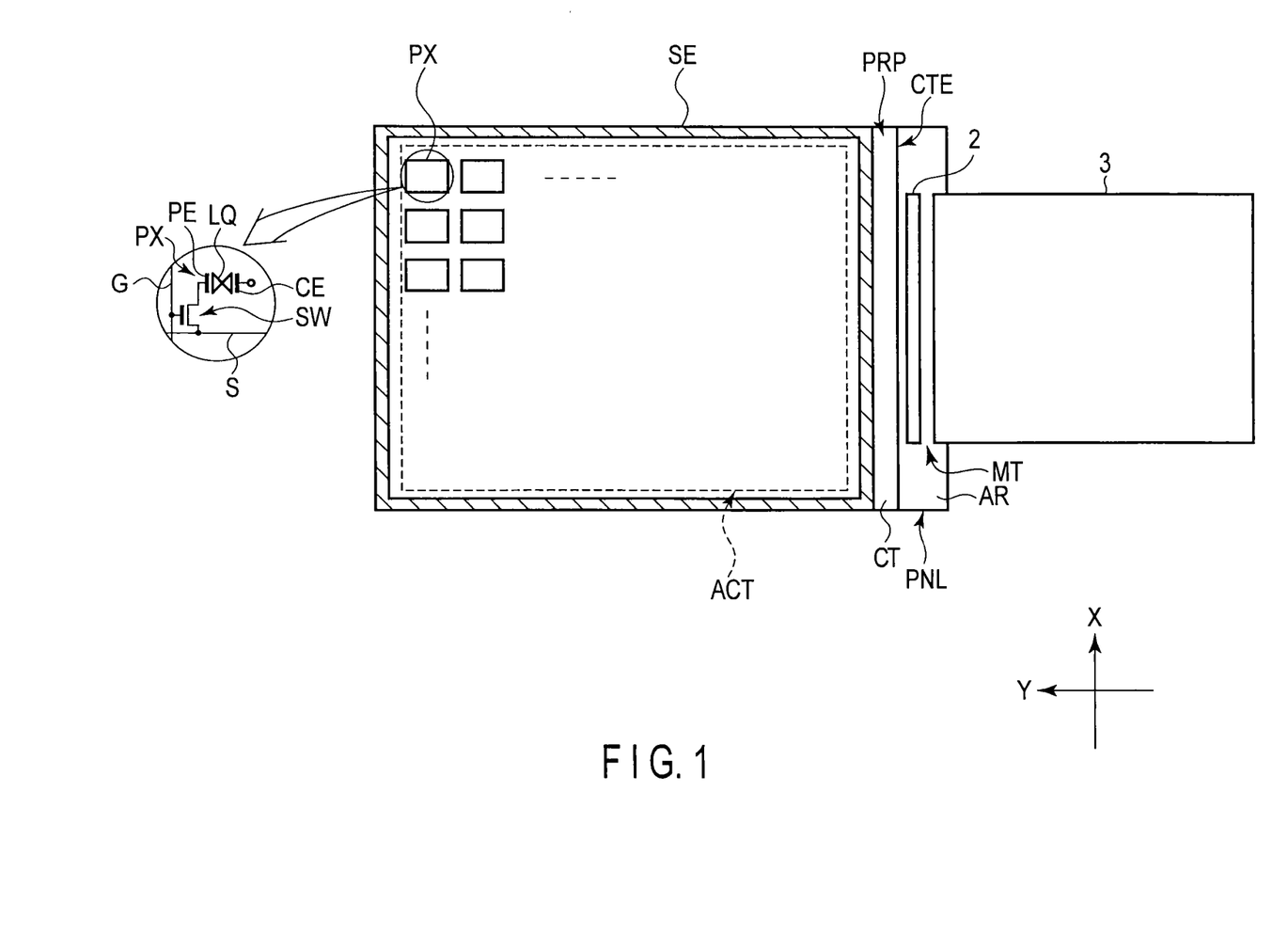
FIG. 1 is a view which schematically illustrates a structure and an equivalent circuit of a display panel PNL, which constitutes a liquid crystal display device according to an embodiment.

FIG. 1 is a view which schematically illustrates a structure and an equivalent circuit of a display panel PNL, which constitutes a liquid crystal display device according to the embodiment.

Specifically, the display panel PNL is an active-matrix-type transmissive liquid crystal display panel, and includes an array substrate AR, a counter-substrate CT which is disposed to be opposed to the array substrate AR, and a liquid crystal layer LQ which is held between the array substrate AR and the counter-substrate CT. The array substrate AR and the counter-substrate CT are attached by a sealant SE in a state in which a predetermined cell gap is formed between the array substrate AR and the counter-substrate CT. In the example illustrated, the sealant SE is formed in a closed loop shape like a rectangular frame shape. The cell gap is formed by columnar spacers which are formed on the array substrate AR or counter-substrate CT. The liquid crystal layer LQ is held in an inside surrounded by the sealant SE in the cell gap between the array substrate AR and the counter-substrate CT. The display panel LPN includes an active area ACT, which displays an image, in the inside surrounded by the sealant SE. The active area ACT has, for example, a substantially rectangular shape, and is composed of a plurality of pixels PX which are arrayed in a matrix.

The array substrate AR includes, in the active area ACT, gate lines G extending in a first direction X, source lines S extending in a second direction Y crossing the first direction X, a switching element SW which is electrically connected to the gate line G and source line S in each pixel PX, and a pixel electrode PE which is connected to the switching element SW in each pixel PX. A common electrode CE of a common potential is provided on the array substrate AR or the counter-substrate CT, and is opposed to plural pixel electrodes PE via the liquid crystal layer LQ.

Although a description of the detailed structure of the display panel PNL is omitted, in a mode which mainly uses a vertical electric field, such as a TN (Twisted Nematic) mode, an OCB (Optically Compensated Bend) mode or a VA (Vertical Aligned) mode, the pixel electrode PE is provided on the array substrate AR, while the common electrode CE is provided on the counter-substrate CT. In addition, in a mode which mainly uses a lateral electric field, such as an IPS (In-Plane Switching) mode or an FFS (Fringe Field Switching) mode, both the pixel electrode PE and counter-electrode CE are provided on the array substrate AR.

Signal supply sources, such as a driving IC chip 2 and a flexible printed circuit (FPC) board 3, which are necessary for driving the display panel PNL, are positioned on a peripheral area PRP on the outside of the active area ACT. In the example illustrated, the driving IC chip 2 and FPC board 3 are mounted on a mounting portion MT of the array substrate AR, which extends outward from a substrate end portion CTE of the counter-substrate CT. The peripheral area PRP is an area surrounding the active area ACT, includes an area where the sealant SE is disposed, and is formed in a rectangular frame shape.

In the meantime, the display panel PNL illustrated is rectangular. As regards the three sides excluding the mounting portion MT, substrate end portions of the array substrate AR and substrate end portions of the counter-substrate CT overlap with each other, and form panel end portions.

Figure 2:
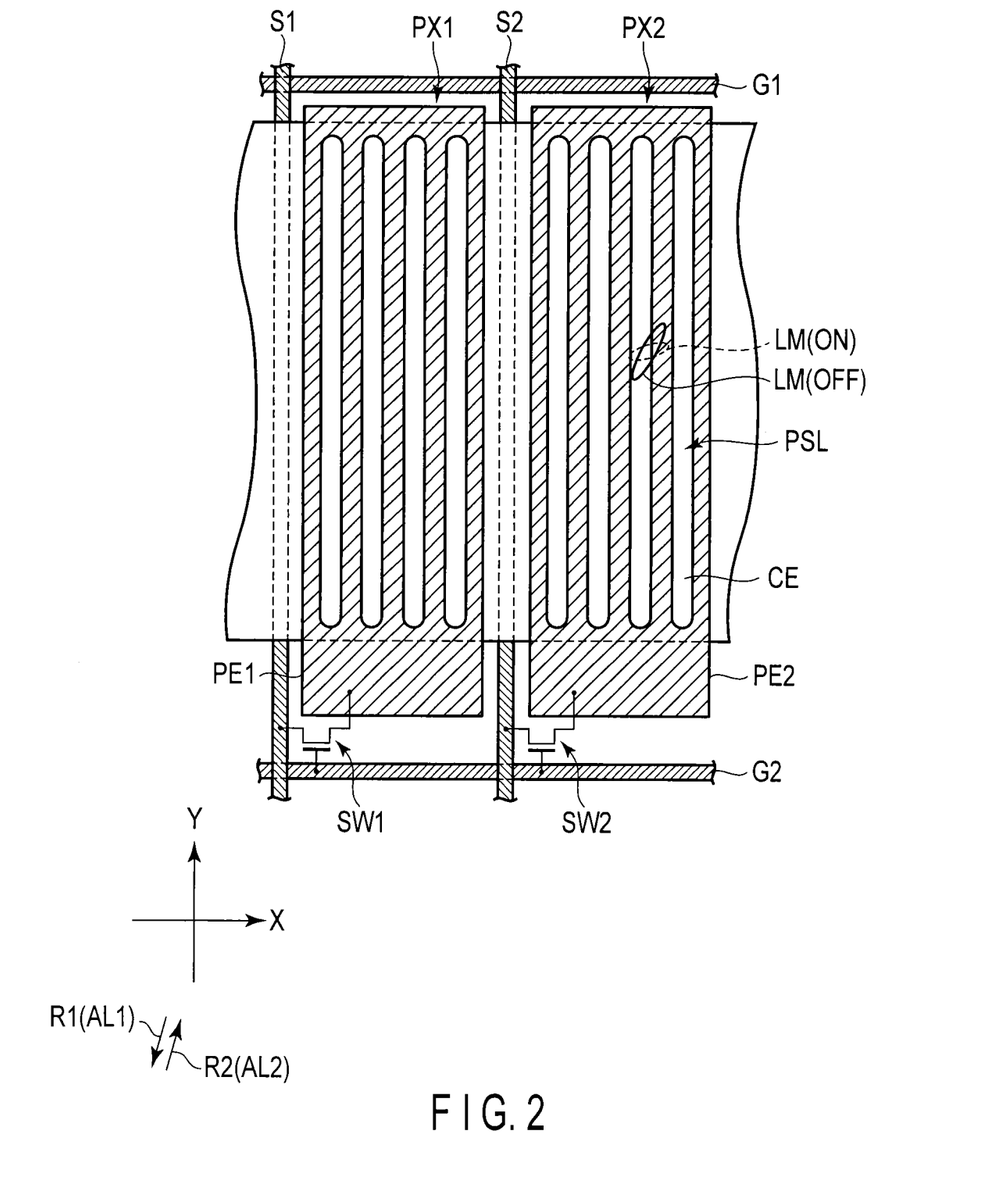
FIG. 2 is a schematic plan view which illustrates a pixel structure on an array substrate AR shown in FIG. 1, as viewed from a counter-substrate CT side.

FIG. 2 is a schematic plan view which illustrates a pixel structure on the array substrate AR shown in FIG. 1, as viewed from the counter-substrate CT side. Although a description is given of, by way of example, the pixel structure to which a mode using a lateral electric field is applied, FIG. 2 illustrates only a main part which is necessary for the description. Pixels PX1 and PX2, which are arranged in the first direction X, are pixels which display mutually different colors.

A gate line G1 and a gate line G2 extend in the first direction X. A source line S1 and a source line S2 extend in the second direction Y and cross the gate line G1 and gate line G2. The pixel PX1, which is defined by the gate line G1 and gate line G2 and the source line S1 and source line S2, has a rectangular shape having a shorter length in the first direction X than in the second direction Y. The pixel PX2 neighbors the pixel PX1 in the first direction X.

A common electrode CE extends in the first direction X, is disposed on the pixel PX1 and PX2, extends above the source lines S1 and S2, and is commonly formed over plural pixels PX which neighbor in the first direction X. Incidentally, the common electrode CE may be commonly formed over plural pixels PX which neighbor in the second direction Y.

In the pixel PX1, a switching element SW1 and a pixel electrode PE1, which is connected to the switching element SW1, are disposed. The switching element SW1 is located near an intersection between the gate line G2 and source line S1, and is electrically connected to the gate line G2 and source line S1. In the pixel PX2, a switching element SW2 and a pixel electrode PE2, which is connected to the switching element SW2, are disposed. The switching element SW2 is located near an intersection between the gate line G2 and source line S2, and is electrically connected to the gate line G2 and source line S2. Each of the switching element SW1 and switching element SW2 is, for instance, a thin-film transistor (TFT).

The pixel electrode PE1 and pixel electrode PE2 are located above the common electrode CE. Each of the pixel electrode PE1 and pixel electrode PE2 is formed in an island shape corresponding to the rectangular pixel shape. In the example illustrated, each of the pixel electrode PE1 and pixel electrode PE2 is formed in a substantially rectangular shape having a shorter length in the first direction X than in the second direction Y. A plurality of slits PSL, which face the common electrode CE, are formed in each of the pixel electrode PE1 and pixel electrode PE2. In the example illustrated, each of the slits PSL extends in the second direction Y.

Figure 3:
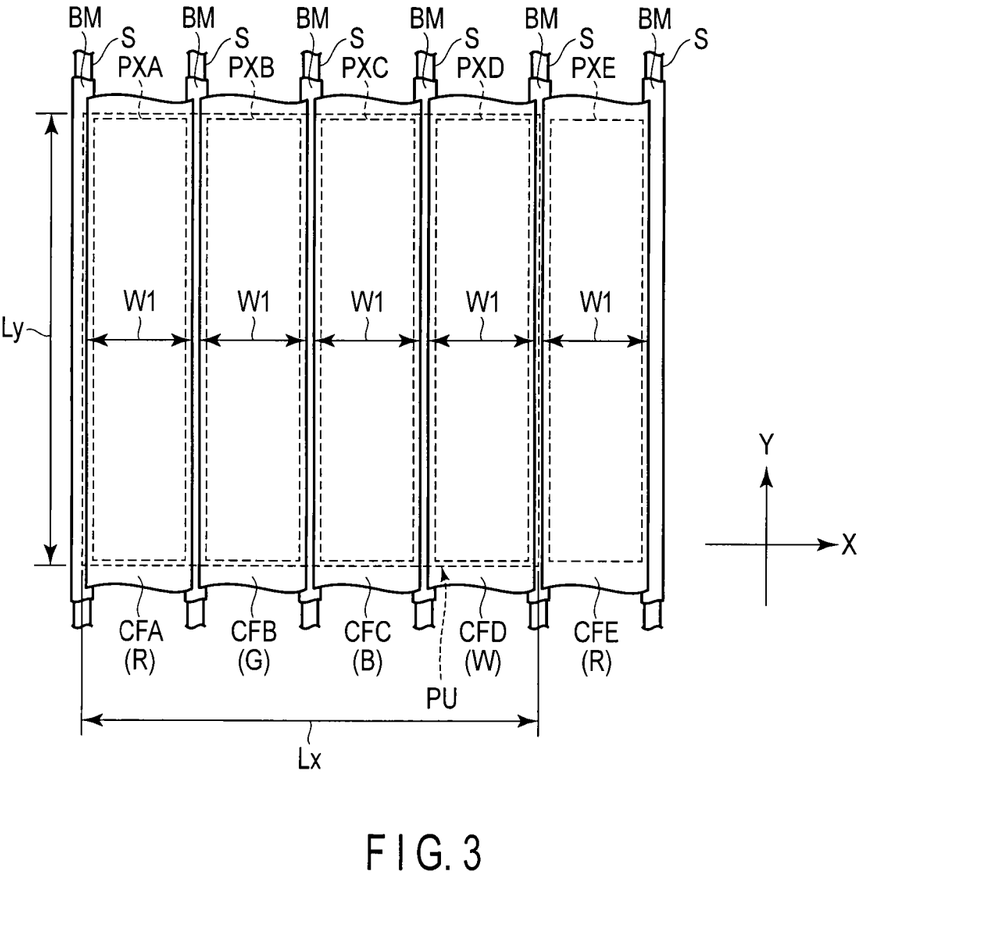
FIG. 3 is a plan view which schematically illustrates an example of a layout of pixels and color filters in the embodiment.

FIG. 3 is a plan view which schematically illustrates an example of a layout of the pixels and color filters in the embodiment. Incidentally, the first direction X and the second direction Y are perpendicular to each other.

A first pixel PXA, a second pixel PXB, a third pixel PXC, a fourth pixel PXD and a fifth pixel PXE are arranged in the named order in the first direction X. Each of the first to fifth pixels has a rectangular shape extending in the second direction Y, as has been described with reference to FIG. 2, and the first to fifth pixels have the same size. In the example illustrated, the first to fourth pixels are pixels which display different colors, and these fourth pixels constitute a unit pixel PU. The unit pixel PU is a minimum unit constituting a color image which is displayed in the active area. The unit pixel PU is formed in a square shape, and a length Lx thereof in the first direction X and a length Ly in the second direction Y are equal. Specifically, the length in the second direction of each of the first to fourth pixels is about four times larger than the length in the first direction X.

Light shield layers BM are disposed at boundaries between the pixels. Each light shield layer BM extends in the second direction Y. The light shield layers BM are located above the source lines S. In addition, the light shield layers BM may be located above the gate lines shown in FIG. 2. In the example illustrated, the light shield layers BM are formed in stripe shapes and are located above only the source lines S. Alternatively, the light shield layers BM may be formed in a grid shape and located above both the gate lines and the source lines. Each of the first to fifth pixels corresponds to an area inside the light shield layers BM, through which backlight can substantially pass.

A first color filter CFA, a second color filter CFB, a third color filter CFC, a fourth color filter CFD and a fifth color filter CFE are arranged in the named order in the first direction X. Each of the first to fifth color filters extends in the second direction Y and is formed in a strip shape. Each of the first to fifth color filters is a color filter of a color which is any one of red, green, blue and white.

For example, the first color filter CFA and fifth color filter CFE are color filters of red (R). The third color filter CFC, which is spaced apart from the first color filter CFA and fifth color filter CFE, is a color filter of blue (B). Specifically, the red color filter does not neighbor the blue color filter. In addition, a color filter of another color is disposed between the red color filter and the blue color filter. In other words, the second color filter CFB, which is located between the first color filter CFA and the third color filter CFC, and the fourth color filter CFD, which is located between the third color filter CFC and the fifth color filter CFE, are color filters of colors different from red and blue. In this case, the second color filter CFB is a color filter of green (G), and the fourth color filter CFD is a color filter of white (W).

The first color filter CFA is disposed in association with the first pixel (red pixel) PXA, the second color filter CFB is disposed in association with the second pixel (green pixel) PXB, the third color filter CFC is disposed in association with the third pixel (blue pixel) PXC, the fourth color filter CFD is disposed in association with the fourth pixel (white pixel) PXD, and the fifth color filter CFE is disposed in association with the fifth pixel (red pixel) PXE.

The first to fifth color filters have their mutually neighboring end portions overlapping the light shield layers BM. In the example illustrated, gaps are created between the first to fifth color filters. However, the mutually neighboring end portions of the first to fifth color filters may overlap at positions overlapping the light shield layers BM.

In the example illustrated, the first to fifth color filters have equal widths W1 in the first direction X. Specifically, the first to fifth pixels also have equal widths in the first direction X. In this configuration in which the pixels are equal in width and the color filters are equal in width, the source lines S are arranged with an equal pitch, there is no need to vary the dimensions of the pixels in the first direction X and second direction Y, the design/manufacturing process can be simplified, and the difference in electrical characteristics between the pixels can be reduced. In addition, since the fourth pixel PXD of white is formed as wide as the pixels of the other colors, the luminance of the unit pixel PU can be enhanced.

Figure 4:
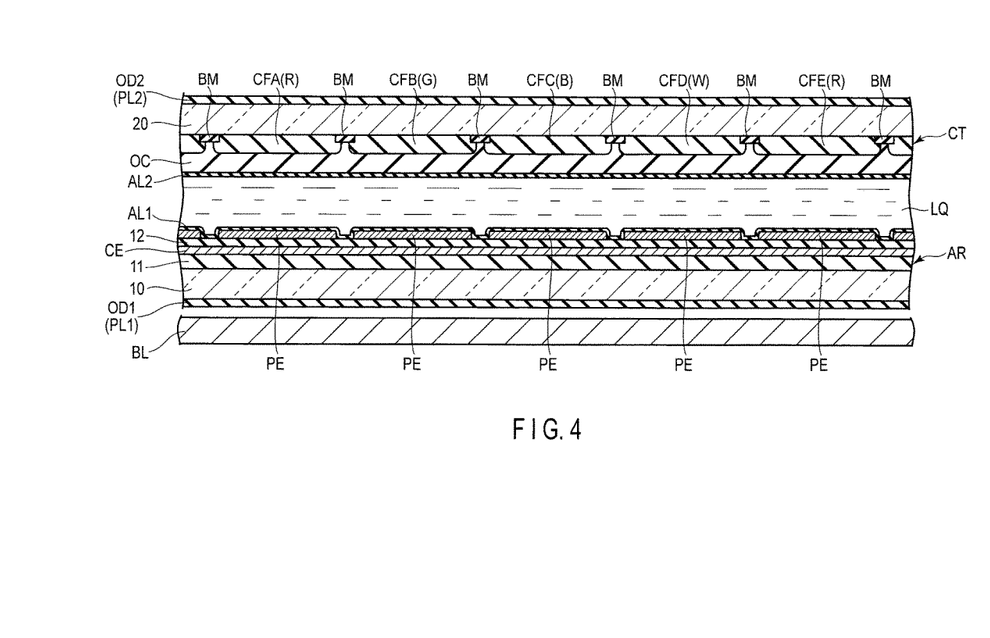
FIG. 4 is a cross-sectional view which schematically illustrates a structure of the display panel PNL, to which the color filters shown in FIG. 3 are applied.

FIG. 4 is a cross-sectional view which schematically illustrates a structure of the display panel PNL, to which the color filters shown in FIG. 3 are applied.

The array substrate AR is formed by using a first insulative substrate 10 which is transparent, such as a glass substrate or a resin substrate. The array substrate AR includes the switching element SW, common electrode CE and pixel electrodes PE shown in FIG. 2 on that side of the first insulative substrate 10, which is opposed to the counter-substrate CT.

The common electrode CE is formed on a first insulation film 11. The common electrode CE is formed of a transparent, electrically conductive material such as indium tin oxide (ITO) or indium zinc oxide (IZO). The common electrode CE is covered with a second insulation film 12.

The pixel electrodes PE are formed on the second insulation film 12 and are opposed to the common electrode CE. Although slits are formed in the pixel electrodes PE, as described above, a detailed illustration is omitted. The pixel electrodes PE are formed of a transparent, electrically conductive material such as ITO or IZO. The pixel electrodes PE are covered with a first alignment film AL1. The alignment film AL1 also covers the second insulation film 12. The first alignment film AL1 is formed of a material which exhibits horizontal alignment properties, and is disposed on that surface of the array substrate AR, which is in contact with the liquid crystal layer LQ.

On the other hand, the counter-substrate CT is formed by using a second insulative substrate 20 which is transparent, such as a glass substrate or a resin substrate. The counter-substrate CT includes light shield layers BM, first color filter CFA, second color filter CFB, third color filter CFC, fourth color filter CFD, fifth color filter CFE, and an overcoat layer OC, on that side of the second insulative substrate 20, which is opposed to the array substrate AR.

The light shield layers BM are formed on an inner surface of the second insulative substrate 20. The light shield layers BM are formed of a black resin material or a light-shielding metallic material. Each of the first to fifth color filters is formed on the inner surface of the second insulative substrate 20. The first color filter CFA and fifth color filter CFE are formed of a resin material which is colored in red. The third color filter CFC is formed of a resin material which is colored in blue. The second color filter CFB is formed of a resin material which is colored in green. The fourth color filter CFD may be formed of a colorless, transparent resin material, may be formed of a white resin material, or may be formed of a resin material which is thinly colored. For example, the fourth color filter CFD may be formed of a resin material which is so thinly colored as to cancel the hue of backlight. In an example, the fourth color filter CFD may be formed of a resin material which is colored in lighter blue than the third color filter CFC. In another example, the fourth color filter CFD may be formed of a resin material which is colored in light yellow.

The overcoat layer OC covers the first to fifth color filters. The overcoat layer OC planarizes asperities on the surfaces of the first to fifth color filters. The overcoat layer OC is formed of a transparent resin material. The overcoat layer OC is covered with a second alignment film AL2. The second alignment film AL2 is formed of a material which exhibits horizontal alignment properties, and is disposed on that surface of the counter-substrate CT, which is in contact with the liquid crystal layer LQ.

The above-described array substrate AR and counter-substrate CT are disposed such that their first alignment film AL1 and second alignment film AL2 are opposed to each other. In this case, a predetermined cell gap is created by columnar spacers between the array substrate AR and counter-substrate CT. The array substrate AR and counter-substrate CT are attached by a sealant in the state in which the cell gap is created. The liquid crystal layer LQ is composed of a liquid crystal composition including liquid crystal molecules LM which are sealed between the first alignment film AL1 of the array substrate AR and the second alignment film AL2 of the counter-substrate CT.

A backlight BL is disposed on the back side of the liquid crystal display panel LPN having the above-described structure. Although various modes are applicable to the backlight BL, a description of the detailed structure of the backlight BL is omitted.

A first optical element OD1 including a first polarizer PL1 is disposed on an outer surface of the array substrate AR, that is, an outer surface of the first insulative substrate 10. A second optical element OD2 including a second polarizer PL2 is disposed on an outer surface of the counter-substrate CT, that is, an outer surface of the second insulative substrate 20.

According to the present embodiment, in the display panel PNL which displays different colors between the pixels neighboring in the first direction X, it is possible to suppress so-called color mixing, due to which the colors of the neighboring pixels are mixed and visually recognized when the display panel PNL is observed from a direction inclined in the first direction X, relative to the normal line of the display panel PNL. In particular, green has a higher relative luminosity or a higher luminance than red and blue. Thus, even when green is mixed with a neighboring color, a mixed color is hardly visually recognized. On the other hand, mixing of blue into red, or mixing of red into blue tends to be visually recognized. In addition, in the display mode using a lateral electric field, when an undesired electric field has occurred between neighboring pixels (e.g. above a source line), liquid crystal molecules are aligned in a direction different from the direction in an OFF state, and there is a tendency that light passes in an oblique view field, as in an ON state. Therefore, a measure against color mixing is important.

In the present embodiment, the red color filter and the blue color filter do not neighbor each other, and a color filter of a color different from red and blue is disposed between the red color filter and the blue color filter. Thus, when the display panel is observed from a direction inclined in the first direction X, color mixing between red and blue can be prevented. Therefore, the display quality can be enhanced.

The inventor prepared, as an example of the embodiment, a display panel PNL in which the above-described array substrate AR and counter-substrate CT are attached, and a cell gap of 3.8 μm was created. When the display panel PNL was observed from an oblique view field, no undesired color mixing was confirmed. In addition, as a comparative example, there was prepared a display panel to which a counter-substrate, in which a red color filter, a green color filter, a blue color filter, a red color filter, . . . , are arranged in the named order, was applied. When this display panel was observed from an oblique view field, color mixing was confirmed. Besides, as regards the display panels of the comparative example and the present embodiment, the transmittance was measured in the state in which white was displayed on the active area. According to the above-described embodiment, a transmittance, which is 1.2 times higher than the transmittance in the comparative example, was obtained.

Next, other examples of the layout will be described.

Figure 5:
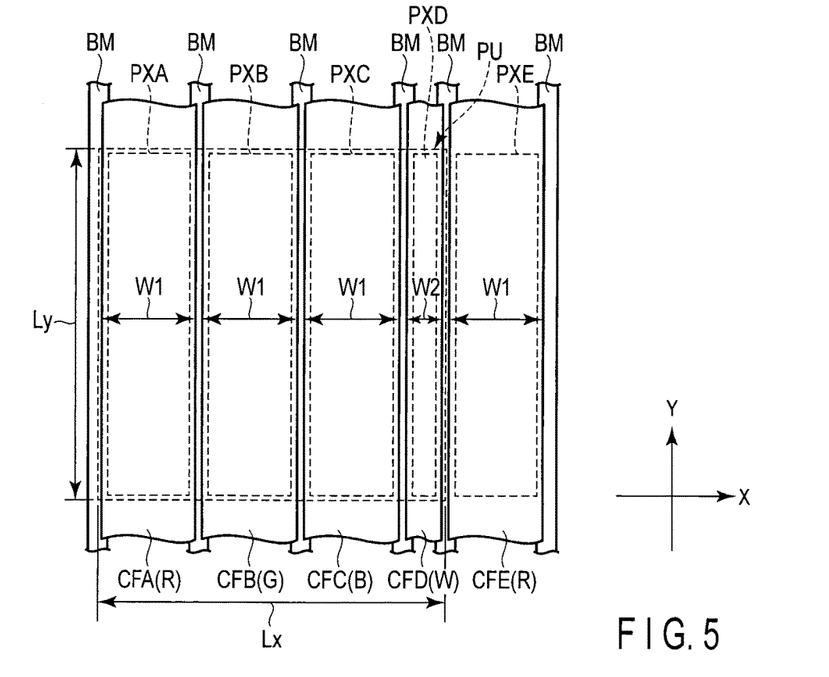
FIG. 5 is a plan view which schematically illustrates another example of the layout of the pixels and color filters in the embodiment.

FIG. 5 is a plan view which schematically illustrates another example of the layout of the pixels and color filters in the embodiment.

The example illustrated in FIG. 5 differs from the example illustrated in FIG. 3 in that the fourth pixel PXD has a smaller width than the other pixels, and that the fourth color filter CFD has a smaller width than the other color filters.

Specifically, the first pixel PXA, second pixel PXB, third pixel PXC, fourth pixel PXD and fifth pixel PXE are arranged in the named order in the first direction X. As has been described with reference to FIG. 2, each of the first to fifth pixels has a rectangular shape extending in the second direction Y. The first pixel (red pixel) PXA, second pixel (green pixel) PXB, third pixel (blue pixel) PXC and fifth pixel (red pixel) PXE are formed to have the same size, and be equal in width in the first direction X. On the other hand, the fourth pixel (white pixel) PXD has a smaller width than the other four pixels (PXA, PXB, PXC, PXE). In the example illustrated, the first to fourth pixels constitute a unit pixel PU. The unit pixel PU is formed in a square shape, and a length Lx thereof in the first direction X and a length Ly in the second direction Y are equal.

If attention is paid to the color filters, the first color filter (red color filter) CFA disposed in the first pixel PXA, the second color filter (green color filter) CFB disposed in the second pixel PXB, the third color filter (blue color filter) CFC disposed in the third pixel PXC and the fifth color filter (red color filter) CFE disposed in the fifth pixel PXE have equal first widths W1. The fourth color filter (white color filter) CFD disposed in the fourth pixel PXD has a second width W2 which is smaller than the first width W1.

In this example, the same advantageous effects as in the above-described example can be obtained. In addition, by reducing the width of the fourth pixel PXD of white while forming the unit pixel PU in the square shape, the widths of the first pixel PXA of red, the second pixel PXB of green and the third pixel PXC of blue can be increased. Alternatively, each of the first to third pixels can be formed with an aspect ratio of about 1:3, without forming each of the first to third pixels in an extremely elongated shape. Therefore, the color purity can be enhanced.

When the inventor prepared a display panel PNL of the example illustrated in FIG. 5 and observed the display panel PNL from an oblique view field, no color mixing was confirmed. In addition, when the transmittance was measured in the state in which white was displayed on the active area, a transmittance, which is 1.05 times higher than the transmittance in the comparative example, was obtained.

Figure 6:
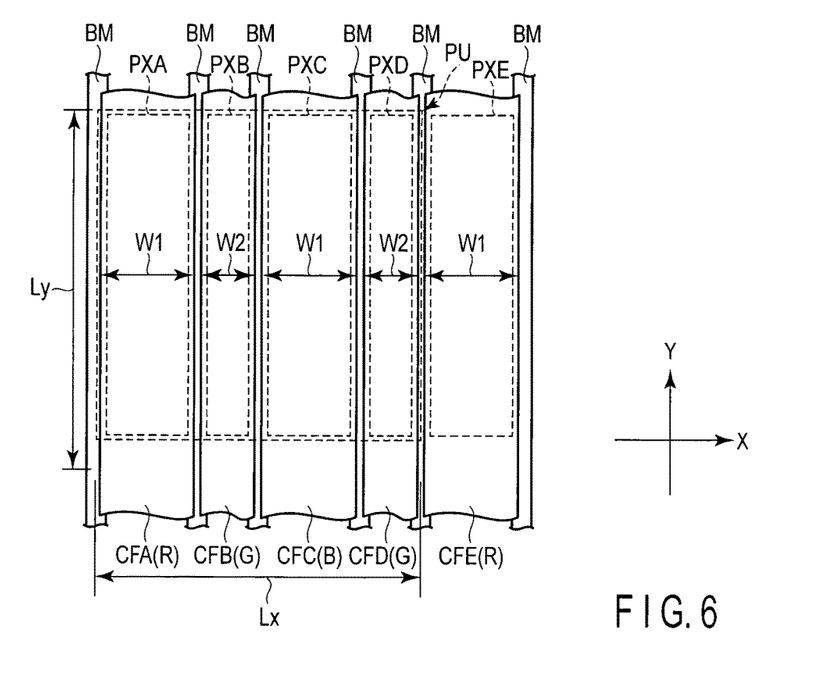
FIG. 6 is a plan view which schematically illustrates still another example of the layout of the pixels and color filters in the embodiment.

FIG. 6 is a plan view which schematically illustrates still another example of the layout of the pixels and color filters in the embodiment.

The first pixel PXA, second pixel PXB, third pixel PXC, fourth pixel PXD and fifth pixel PXE are arranged in the named order in the first direction X. As has been described with reference to FIG. 2, each of the first to fifth pixels has a rectangular shape extending in the second direction Y. The first pixel PXA, third pixel PXC and fifth pixel PXE are formed to have the same size, and are equal in width in the first direction X. On the other hand, the second pixel PXB and fourth pixel PXD are formed to have the same size, and are equal in width in the first direction X. It should be noted, however, that each of the second pixel PXB and fourth pixel PXD has a smaller width than the other three pixels (PXA, PXC, PXE). In the example illustrated, the first to fourth pixels constitute a unit pixel PU. The unit pixel PU is formed in a square shape, and a length Lx thereof in the first direction X and a length Ly in the second direction Y are equal.

The first color filter CFA, second color filter CFB, third color filter CFC, fourth color filter CFD and fifth color filter CFE are arranged in the named order in the first direction X. Each of the first to fifth color filters extends in the second direction Y and is formed in a strip shape.

Each of the first to fifth color filters is a color filter of a color which is any one of red, green and blue. For example, the first color filter CFA and fifth color filter CFE are color filters of red. The third color filter CFC is a color filter of blue. The second color filter CFB and fourth color filter CFD are color filters of green. The first color filter CFA is disposed in association with the first pixel (red pixel) PXA, the second color filter CFB is disposed in association with the second pixel (green pixel) PXB, the third color filter CFC is disposed in association with the third pixel (blue pixel) PXC, the fourth color filter CFD is disposed in association with the fourth pixel (green pixel) PXD, and the fifth color filter CFE is disposed in association with the fifth pixel (red pixel) PXE.

The first color filter (red color filter) CFA, the third color filter (blue color filter) CFC and the fifth color filter (red color filter) CFE have equal first widths W1. The second color filter (green color filter) CFB has a second width W2 which is smaller than the first width W1. The fourth color filter (green color filter) CFD has a second width W2 which is smaller than the first width W1. In the example illustrated, the second color filter CFB and fourth color filter CFD have equal second widths W2. The second width W2 is, for example, ½ of the first width W1. Specifically, the sum of the second width W2 of the second color filter CFB and the second width W2 of the fourth color filter CFD is equal to the first width W1 of the first color filter CFA.

In this example, it is possible to suppress color mixing between red and blue in an oblique view field by the color filters of three primary colors (red, green, blue) alone, which are necessary for color display, without using a white color filter. In addition, in the unit pixel PU, the red pixel, green pixels, and blue pixel have equal areas, and a hue at a time of displaying white can be suppressed and a good color balance can be maintained.

When the inventor observed the display panel PNL of the example shown in FIG. 6 from an oblique view field, no color mixing was confirmed.

Figure 7:
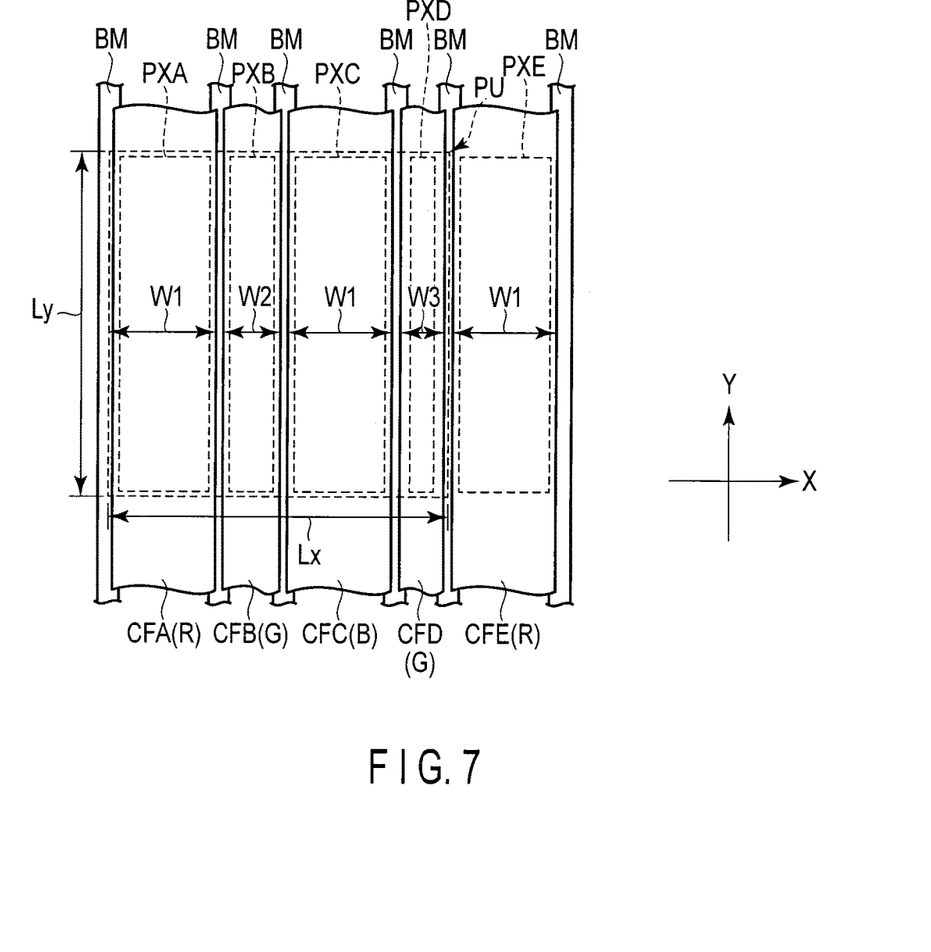
FIG. 7 is a plan view which schematically illustrates still another example of the layout of the pixels and color filters in the embodiment.

FIG. 7 is a plan view which schematically illustrates still another example of the layout of the pixels and color filters in the embodiment.

The example illustrated in FIG. 7 differs from the example illustrated in FIG. 6 in that the fourth pixel PXD has a width which is different from the width of the second pixel PXB, and the fourth color filter CFD has a width which is different from the width of the second color filter CFB.

Specifically, the first pixel (red pixel) PXA, third pixel (blue pixel) PXC and fifth pixel (red pixel) PXE are equal in width. The second pixel (green pixel) PXB has a smaller width than the above-described three pixels (PXA, PXC, PXE). In addition, the fourth pixel (green pixel) PXD has a smaller width than the three pixels (PXA, PXC, PXE). In the example illustrated, the fourth pixel PXD has a smaller width than the second pixel PXB. The first to fourth pixels constitute a unit pixel PU. The unit pixel PU is formed in a square shape, and a length Lx thereof in the first direction X and a length Ly in the second direction Y are equal.

If attention is paid to the color filters, the first color filter (red color filter) CFA, the third color filter (blue color filter) CFC and the fifth color filter (red color filter) CFE have equal first widths W1. The second color filter (green color filter) CFB has a second width W2 which is smaller than the first width W1. The fourth color filter (green color filter) CFD has a third width W3 which is smaller than the first width W1. In the example illustrated, the third width W3 is smaller than the second width W2. It should be noted, however, that the sum of the second width W2 and third width W3 is equal to the first width W1.

In this example, too, the same advantageous effects as in the above-described examples can be obtained.

When the inventor observed the display panel PNL of the example shown in FIG. 7 from an oblique view field, no color mixing was confirmed.

As has been described above, according to the present embodiment, a liquid crystal display device which can enhance display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a first substrate including a switching element, a pixel electrode electrically connected to the switching element, and a common electrode of a common potential;
   a second substrate including an insulative substrate and a color filter layer formed on that side of the insulative substrate, which is opposed to the first substrate, the color filter layer including a first color filter of red, a third color filter of blue which is spaced apart from the first color filter, a fifth color filter of red which is spaced apart from the third color filter, a second color filter which is located between the first color filter and the third color filter and has a color which is different from red and blue, and a fourth color filter which is located between the third color filter and the fifth color filter and has a color which is different from red and blue; and
   a liquid crystal layer held between the first substrate and the second substrate,
   wherein the first color filter, the second color filter, the third color filter, and the fifth color filter are equal in width,
   the fourth color filter is smaller in width than the other color filters, and
   the first to fourth color filters constitute a square unit pixel.

2. The liquid crystal display device of claim 1, wherein the second color filter is green, and the fourth color filter is white.

3. The liquid crystal display device of claim 2, wherein a first pixel in which the first color filter is disposed, a second pixel in which the second color filter is disposed, a third pixel in which the third color filter is disposed, and a fourth pixel in which the fourth color filter is disposed are arranged in named order in a first direction, and each of the pixels that are arranged in named order extends in a second direction perpendicular to the first direction.

4. The liquid crystal display device of claim 3, wherein the first to fourth pixels constitute a square unit pixel.

5. A liquid crystal display device comprising:
   a first substrate including a switching element, a pixel electrode electrically connected to the switching element, and a common electrode of a common potential;
   a second substrate including an insulative substrate and a color filter layer formed on that side of the insulative substrate, which is opposed to the first substrate, the color filter layer including a first color filter of red, a third color filter of blue which is spaced apart from the first color filter, a fifth color filter of red which is spaced apart from the third color filter, a second color filter of green which is located between the first color filter and the third color filter, and a fourth color filter of green which is located between the third color filter and the fifth color filter; and
   a liquid crystal layer held between the first substrate and the second substrate,
   wherein the first color filter, the third color filter, and the fifth color filter are equal in width,
   the second color filter and the fourth color filter are smaller in width than the other color filters, and the first to fourth color filters constitute a square unit pixel.

6. The liquid crystal display device of claim 5, wherein each of a width of the second color filter and a width of the fourth color filter is ½ of a width of the first and third color filters.

7. The liquid crystal display device of claim 5, wherein a width of the second color filter and a width of the fourth color filter are different.

8. The liquid crystal display device of claim 7, wherein a sum of the width of the second color filter and the width of the fourth color filter is equal to a width of the first color filter.

9. The liquid crystal display device of claim 5, wherein a first pixel corresponding to the first color filter, a second pixel corresponding to the second color filter, a third pixel corresponding to the third color filter, and a fourth pixel corresponding to the fourth color filter are arranged in named order in a first direction, and each of the pixels that are arranged in named order extends in a second direction perpendicular to the first direction.

10. The liquid crystal display device of claim 9, wherein the first to fourth pixels constitute a square unit pixel.

11. The liquid crystal display device of claim 3, wherein an aspect ratio of the first pixel, the second pixel and the third pixel is approximately 1:3.

12. The liquid crystal display device of claim 9, wherein an aspect ratio of the first pixel, the third pixel and the fifth pixel is approximately 1:3.

13. The liquid crystal display device of claim 1, wherein each of a first pixel in which the first color filter is disposed, a second pixel in which the second color filter is disposed, a third pixel in which the third color filter is disposed, and a fourth pixel in which the fourth color filter is disposed has a rectangular shape, and the first to fourth color filters constitute a square unit pixel.

14. The liquid crystal display device of claim 5, wherein each of a first pixel in which the first color filter is disposed, a second pixel in which the second color filter is disposed, a third pixel in which the third color filter is disposed, and a fourth pixel in which the fourth color filter is disposed has a rectangular shape, and
the first to fourth color filters constitute a square unit pixel.

15. The liquid crystal display device of claim 1, wherein a first pixel in which the first color filter is disposed, a second pixel in which the second color filter is disposed, a third pixel in which the third color filter is disposed, and a fifth pixel in which the fifth color filter is disposed have a first width in a first direction, and
a fourth pixel in which the fourth color filter is disposed has a smaller width than the first width in a first direction.

16. The liquid crystal display device of claim 15, wherein the first to fifth pixels have equal lengths in a second direction crossing the first direction.

17. The liquid crystal display device of claim 5, wherein a first pixel in which the first color filter is disposed, a third pixel in which the third color filter is disposed, and a fifth pixel in which the fifth color filter is disposed have a first width in a first direction, and
each of a second pixel in which the second color filter is disposed and a fourth pixel in which the fourth color filter is disposed has a smaller width than the first width in a first direction.

18. The liquid crystal display device of claim 17, wherein the first to fifth pixels have equal lengths in a second direction crossing the first direction.

* * * * *